(No Model.)
H. S. MAXIM.
ELECTRICAL ENGINEERING.
No. 255,312. Patented Mar. 21, 1882.
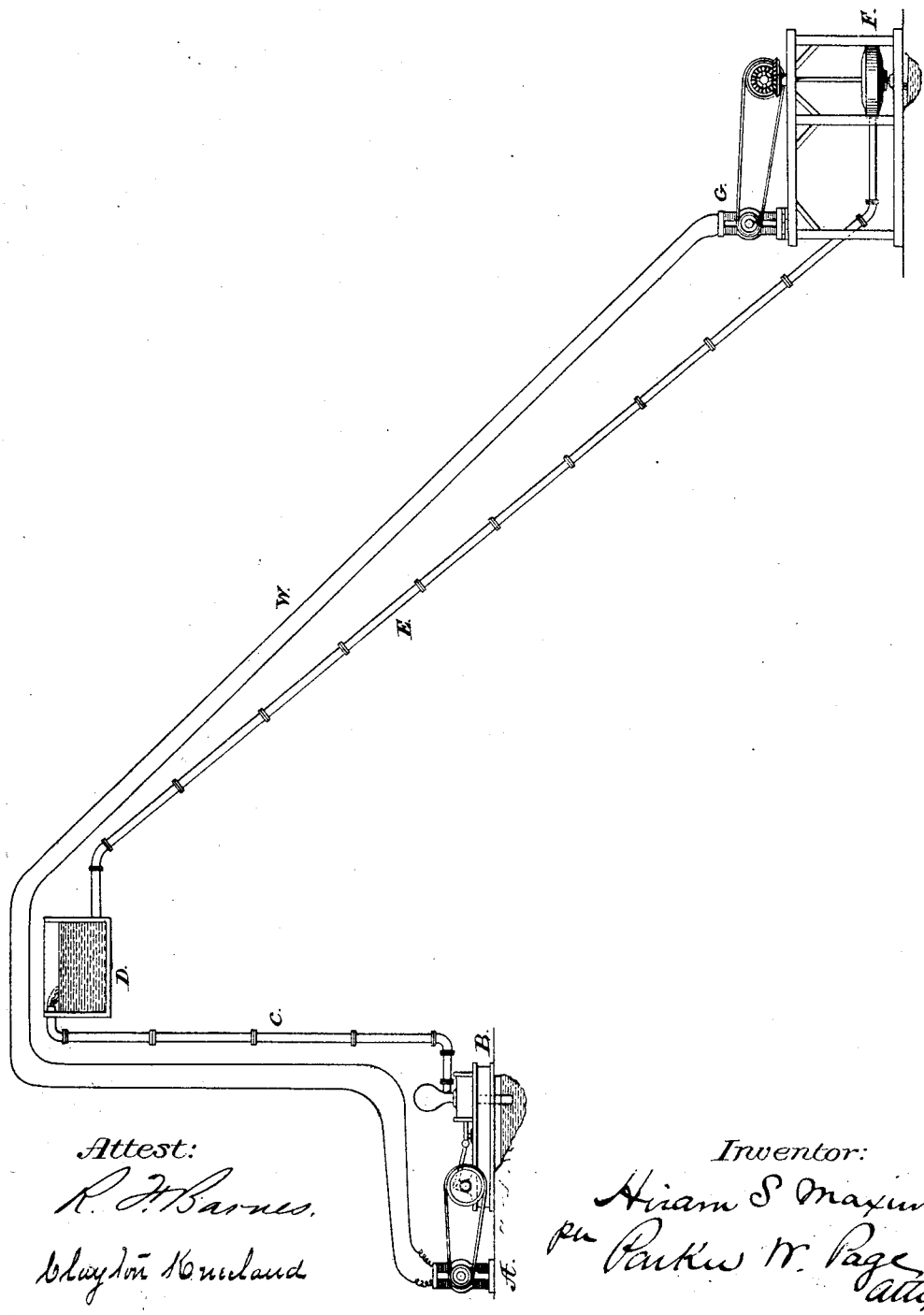
Attest:
R. F. Barnes.
Clayton Hurland
Inventor:
Hiram S. Maxim
per Parker W. Page
Atty

UNITED STATES PATENT OFFICE.

HIRAM S. MAXIM, OF BROOKLYN, ASSIGNOR TO THE UNITED STATES ELECTRIC LIGHTING COMPANY, OF NEW YORK, N. Y.

ELECTRICAL ENGINEERING.

SPECIFICATION forming part of Letters Patent No. 255,312, dated March 21, 1882.

Application filed August 10, 1881. (No model.)

*To all whom it may concern:*

Be it known that I, HIRAM S. MAXIM, of Brooklyn, in the county of Kings and State of New York, have invented certain Improvements in Electrical Engineering, of which the following is a specification.

My present invention is a system of draining mines or excavations by the co-operative action of electro-magnetic motors and suitable mechanical appliances, in which the power necessary to drive the motors is obtained, under certain conditions hereinafter specified, from the water pumped from the mine.

Many mines and similar excavations which require constant drainage by means of a system of pumps are located at considerable elevations, as in the side of a mountain. Where this is the case and where available ground can be had at a point more than twice as far below the mouth of the shaft as the perpendicular distance through which the water has to be forced or pumped in the mine, my system is applicable, and will be found very serviceable, from the fact that it involves no expense in the matter of fuel or steam engines.

In principle the system contemplated by me depends upon the well known law that the effective energy of a given head of water is represented by the product of its weight in pounds and the vertical distance through which it falls, so that if the water pumped out of a mine can be given a sufficient head it is evident that its energy can be converted into a force equal to or greater than that required to effect the pumping itself. In order to render available this force, I convert it into an electric current, which is conveyed back to the pump, where it is utilized to drive electric motors that operate the pumps. Suppose, therefore, that it be desired to drain a mine two hundred feet in depth, the method would be as follows: At the lowest level of the mine, or wherever the force-pumps are located, are also placed a sufficient number of electro-magnetic motors arranged to work the pumps.

The conduit through which the water is forced to the mouth of the shaft is connected with a tank or reservoir of suitable dimensions, from which leads a second conduit to a station, say, six hundred feet below the mouth of the shaft, where is located a turbine or other water wheel and one or a system of dynamo-electric generators, the conductors from which lead to the motors in the mine.

Assuming that the turbine in the above-described example is run by the full head of water, the dynamo-machines will at once generate a current that runs the motors, while these latter keep the pumps in operation and maintain a constant supply of water to the turbine. In such a system there is a loss in the conversion of energy of about fifty per cent., so that the water pumped out must have a fall more than twice as great as the vertical distance through which it is forced—say three or four times as great.

To start the system in operation it is necessary to have at hand a source of potential energy—such as the water in the reservoir above described—or else to employ an engine with the dynamo-machines until the water pumped from the mine reaches the turbine, the former means being much preferable on the score of economy and convenience.

The drawings are an illustration of the system.

A represents a motor, located at the bottom of a mine or other excavation; B, a force-pump driven thereby; C, a conduit, through which the water is forced by the pump to a large tank or reservoir, D, located at the mouth of the shaft. E is a pipe or conduit for conveying the water to a turbine, F, situated at the proper level below the mouth of the mine. G is a dynamo-electric generator geared with the turbine, and W are the wires for conveying the current from the same to motor A.

The operation of the system in the light of the above explanations will be readily understood.

It may be stated that in case the amount of water pumped up from the mine be in excess of that required for driving the turbine, the surplus may be carried off from the tank, and in most cases it will be found advisable to contrive the system to effect this. With this system a constant supply of water at all seasons is obtained for working the pumps so long as there is any water to be pumped up.

The invention is applicable in many kinds of mining, and may be employed to advantage in other systems of drainage, pumping, and conversion of power where the same conditions as the above obtain.

Having thus described my invention, what I claim as new, and desire to secure by Letters Patent, is—

1. The method of draining mines or other excavations, which consists in converting the force of the water pumped up into an electric current when the same shall have fallen a distance greater than twice the vertical distance through which it was forced up, then reconverting the current into power and utilizing said power to work the pumps, substantially as described.

2. In a system of drainage substantially as hereinbefore described, the combination of an electro-magnetic motor, a force-pump, a turbine or other wheel located at a proper distance below the said force-pump, connected by suitable pipes therewith, a dynamo-electric generator, and wires connecting the same with the motor, these devices being arranged and combined for mutual operation substantially as set forth and described.

3. In a system of drainage substantially as hereinbefore described, the combination of an electro-magnetic motor, a force-pump, and a pipe for the water raised thereby, a reservoir or tank for receiving the water, an eduction-pipe from the reservoir, a water-wheel located at a proper distance below the same, a dynamo-electric machine, and line-wires connecting the said machine with the motor, these devices being arranged and combined for mutual operation substantially as shown and described.

In testimony whereof I have hereunto set my hand this 5th day of August, 1881.

HIRAM S. MAXIM.

Witnesses:
PARKER W. PAGE,
CLAYTON KNEELAND.